(12) United States Patent
Dechelle et al.

(10) Patent No.: US 11,460,130 B2
(45) Date of Patent: Oct. 4, 2022

(54) EASY TO MANOEUVRE FLUIDIC CONNECTOR

(71) Applicant: COMMISSARIAT A L'ENERGIE ATOMIQUE ET AUX ENERGIES ALTERNATIVES, Paris (FR)

(72) Inventors: Christian Dechelle, Grenoble (FR); Eric Villedieu, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 290 days.

(21) Appl. No.: 16/516,103

(22) Filed: Jul. 18, 2019

(65) Prior Publication Data

US 2020/0025313 A1 Jan. 23, 2020

(30) Foreign Application Priority Data

Jul. 20, 2018 (FR) ..................................... 1856740

(51) Int. Cl.
*F16L 15/00* (2006.01)
*F16L 43/02* (2006.01)
*F16L 27/08* (2006.01)

(52) U.S. Cl.
CPC ......... *F16L 15/008* (2013.01); *F16L 27/0845* (2013.01); *F16L 43/02* (2013.01)

(58) Field of Classification Search
CPC .... F16L 15/008; F16L 27/0845; F16L 19/062
USPC ........................... 285/185, 191, 272.1, 179.1
See application file for complete search history.

(56) References Cited

U.S. PATENT DOCUMENTS

| | | | |
|---|---|---|---|
| 353,154 A * | 11/1886 | Miller | |
| 3,507,521 A * | 4/1970 | Bridgland, Jr. | ........... E03B 9/12 285/147.2 |
| 6,260,888 B1 * | 7/2001 | McLaughlin | ....... F01N 13/1805 181/240 |
| 6,456,682 B1 * | 9/2002 | Jensen | .................. G21C 13/036 376/282 |
| 6,902,200 B1 * | 6/2005 | Beadle | ..................... F16C 11/04 285/185 |
| 8,702,130 B1 | 4/2014 | Zelechonok | |
| 2012/0001418 A1 | 1/2012 | Garcin et al. | |

FOREIGN PATENT DOCUMENTS

| | | |
|---|---|---|
| FR | 644 520 A | 10/1928 |
| WO | 84/00594 A1 | 2/1984 |
| WO | 2011/153980 A1 | 12/2011 |
| WO | 2012/131049 A1 | 10/2012 |
| WO | 2013/152396 A1 | 10/2013 |

* cited by examiner

*Primary Examiner* — James M Hewitt, II
(74) *Attorney, Agent, or Firm* — BakerHostetler

(57) ABSTRACT

A fluidic connector intended to enable the circulation of a fluid and includes two parts configured to be coupled, each of the parts comprising a channel, the two channels communicating when the two parts are coupled, the fluid being intended to be conveyed by the two channels, and a locking mechanism configured to bear on a first of the two parts and to exert a force on a second of the two parts in order to hold the two parts in position when the two parts are coupled, the locking mechanism passing through an opening in the first of the two parts.

10 Claims, 6 Drawing Sheets

EASY TO MANOEUVRE FLUIDIC CONNECTOR

CROSS-REFERENCE TO RELATED APPLICATIONS

This application claims priority to foreign French patent application No. FR 1856740, filed on Jul. 20, 2018, the disclosure of which is incorporated by reference in its entirety.

BACKGROUND

The invention concerns an easy to manoeuvre fluidic connector. Pressurized fluid networks are present in many fields. The fluids transported by those networks may be gases, liquids, two-phase fluids. Solid particles may also be in suspension in those fluids. The networks necessitate connections between different channels. A fluidic connector enables communication to be established between two channels or a branch connection to be produced in one channel. It is possible to produce a definitive connection by gluing or welding two channels together. However, it may be necessary to enable demounting of the connection, for example to connect a source of fluid to the network and to enable changing of that source. To put it more simply, to provide for maintenance of the network mounting and demounting a connection may be necessary.

A connection may be mounted and demounted by an operative. However, in some environments, access may be impossible, in particular because of accessibility, because of the presence of numerous interwoven pipes or because of an environment that is hazardous for the operator, in particular in the chemical or nuclear field.

It is conventionally possible to employ a connector connecting two aligned channels. Locking is effected by means of a screw-on outer ring. One such connector is described for example in the document WO 2012/131049 A1. It may be impossible to manoeuvre the ring because of the presence of other devices in its vicinity.

It is possible to provide connectors that can be operated at a distance (operated remotely). Known for example are bayonet connectors and locking connectors developed by the company Stäubli the registered office of which is in Switzerland: Poststrasse 5, 8808 Pfäffikon SZ. RBE™ type connectors are for example supplied for the nuclear environment and appropriate tools enable them to be manipulated at a distance. This type of connector exists only for small pipe diameters, typically less than 20 mm.

To connect pipes of larger diameter it is possible to employ flanges compressing a seal and compressed by means of a plurality of screws around the seal. There also exist collar type flanges with clamping produced by means of a chain around the flanges. This type of flanged assembly necessitates a large space available around the flanges for mounting and demounting them. Moreover, when remote operation is necessary, installing maintenance tools can be complicated.

SUMMARY OF THE INVENTION

The invention aims to alleviate some or all of the problems cited above by proposing an easy to connect and disconnect fluidic connector.

To this end, the invention consists in a fluidic connector intended to enable the circulation of a fluid and comprising two parts configured to be coupled, each of the parts comprising a channel, the two channels communicating when the two parts are coupled, the fluid being intended to be conveyed by the two channels. The fluidic connector further comprises a locking mechanism configured to bear on a first of the two parts and to exert a force on a second of the two parts in order to hold the two parts in position when the two parts are coupled. The locking mechanism passes through an opening in the first part.

The locking mechanism advantageously comprises a solid tie-rod occupying the opening apart from the functional clearance.

The fluidic connector advantageously comprises a seal separating the channels from the opening.

The locking mechanism may comprise a screw a head of which bears on the first part, the screw passing through the opening and cooperating with a screwthread produced in an axial end of the second part.

Alternatively, the locking mechanism comprises a threaded rod extending the first part from an axial end of the first part and a nut cooperating with the threaded rod and bearing on the first part.

One of the two parts may comprise a female frustoconical surface; the other of the two parts may comprise a male frustoconical surface, the two frustoconical surfaces being complementary, an interference fit between the two frustoconical surfaces enabling the relative position of the two parts to establish communication between the two channels. The locking mechanism is then configured to exert a force on the second part along an axis of the female frustoconical surface.

In a variant employing frustoconical surfaces and a screw, the latter may extend along the axis of the female frustoconical surface and the screwthread is then produced in an axial end of the second part forming the smallest diameter section of the male frustoconical surface.

In a variant employing frustoconical surfaces and a threaded rod, the latter may extend along an axis of the male frustoconical surface from an axial end of the second part forming the smallest diameter section of the male frustoconical surface.

The locking mechanism advantageously exerts a force at the centre of the axial end of the second part.

The two frustoconical surfaces have an angle at the apex advantageously defined to provide self-adhesion of the two frustoconical surfaces when fitted together and the second part comprises an extractor able to exert a force opposite the traction enabling decoupling of the two parts.

The screw is advantageously configured to bear on the extractor in order to exert on the first part a force on the screw relative to the second part, the force being oriented in such a manner as to decouple the two frustoconical surfaces.

The screw may bear on the second part via an elastic element tending to move the screw away from its bearing surface after unscrewing the screw from the screwthread of the first part.

The extractor is advantageously configured to render the screw captive.

Each of the two frustoconical surfaces is advantageously a surface of revolution about an axis, the axes of the two frustoconical surfaces coinciding once the two parts of the connector are coupled, and the fluidic connector comprises a set of angular abutments configured to define at least one orientation of the two parts about the coincident axes.

The set of angular abutments may be configured to define a plurality of angular orientations of the two parts about the coincident axes, one of the orientations enabling communication to be established between the two channels, another of the orientations enabling interruption of the communication between the two channels.

The fluidic connector advantageously comprises one or more seals disposed between the two parts and the traction means are then adapted to compress the seal or seals.

BRIEF DESCRIPTION OF THE DRAWINGS

The invention will be better understood and other advantages will become apparent on reading the detailed description of embodiments given by way of example with reference to the appended drawings, in which.

For clarity, the same elements bear the same references in the various figures.

DETAILED DESCRIPTION

Figures 1A, 1B:
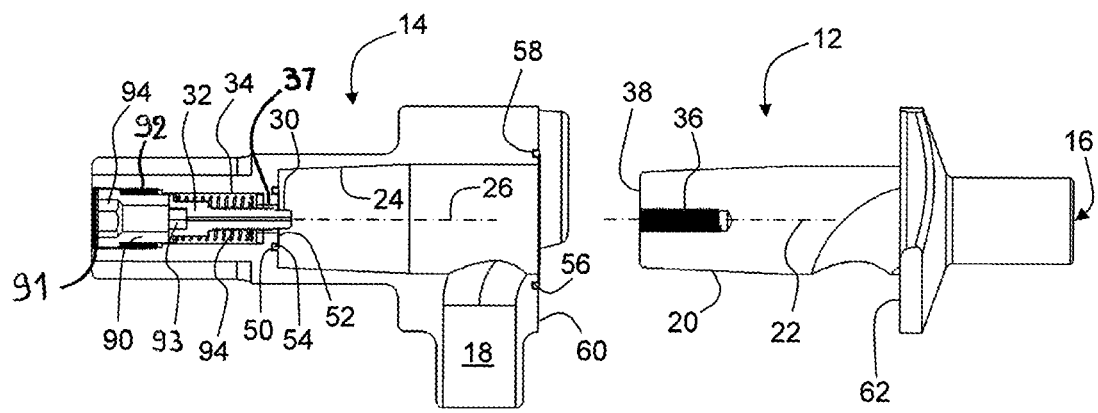
FIGS. 1a and 1b respectively represent two separated parts of one example of a fluidic connector according to the invention.

The invention relates to a fluidic connector 10 comprising two parts 12 and 14 that can be coupled. FIG. 1a represents the part 14 and FIG. 1b represents the part 12 of a first variant of a fluidic connector according to the invention. FIGS. 1a and 1b represent the two parts separated from one another, that is to say with the connector decoupled. The first part 12 comprises a channel 16 and the second part 14 comprises a channel 18. When the two parts 12 and 14 of the connector 10 are coupled the two channels 16 and 18 communicate inside the connector 10. The fluidic connector 10 may be used to convey any type of gas, liquid or two-phase fluid circulating in the channels 16 and 18. Solid particles may also be in suspension in the fluid.

In the first variant, the two parts 12 and 14 are positioned by means of frustoconical surfaces. To be more precise, the part 14 comprises a male frustoconical surface 20 of revolution about an axis 22 and the part 16 comprises a female frustoconical surface 24 of revolution about an axis 26. The two frustoconical surfaces 20 and 24 are complementary. When the two frustoconical surfaces 20 and 24 are one inside the other the axes 22 and 26 coincide. The same geometrical parameters define the two frustoconical surfaces 20 and 22; in particular they have the same angle at the apex and both extend over a common distance along their respective axis relative to their apex which therefore coincide in the interference fit.

When the two frustoconical surfaces 20 and 24 are one inside the other the channels 16 and 18 communicate inside the connector 10.

The part 14 comprises a locking mechanism on the axis 26 of the female frustoconical surface configured to exert a force on the part 12 in order to retain the two parts 12 and 14 in position when the two parts are coupled.

In the example shown, the locking mechanism comprises a screw 30 extending along the axis 26 of the female frustoconical surface 24. The screw 30 comprises a head 32 bearing on the bottom of a spot facing 34 on the second part 14. Also, a screwthread 36 is formed in the part 12. The screwthread 36 extends along the axis 22. The screwthread 36 is produced in an axial end 38 of the part 12 forming the smallest diameter section of the frustoconical surface 20. The screwthread 36 is complementary to the screwthread of the screw 30. The screw 30 passes through an opening 37 in the part 14. The screw 30 passes through a plane face 52 of the part 14 forming the smallest diameter axial end of the female frustoconical surface 24. After the two frustoconical surfaces 20 and 24 are fitted together, tightening the screw 30 in the screwthread 36 enables a traction force to be exerted on the part 12 to lock the interference fit of the two frustoconical surfaces 20 and 24 in one another.

Figure 2A:
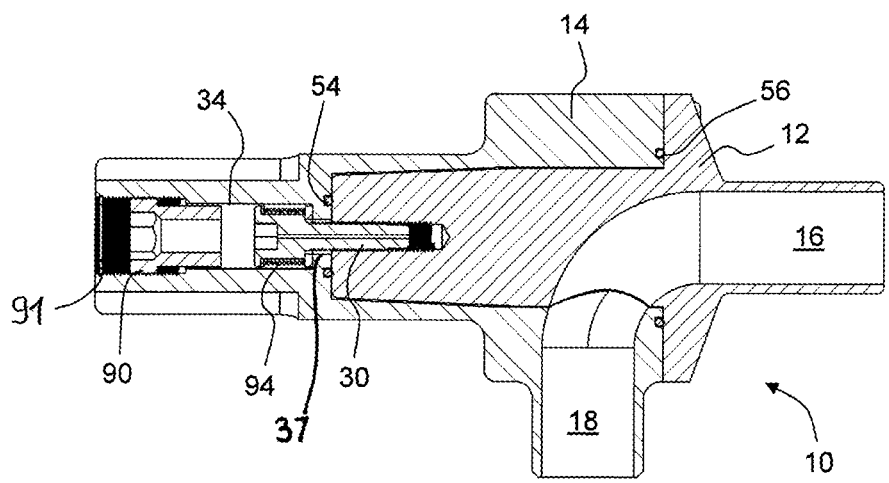
FIGS. 2a, 2b, 2c, 2d, 2e and 2f represent a plurality of variants of a fluidic connector according to the invention when coupled.

FIG. 2a shows the two parts 12 and 14 when coupled. In this position the screw 30 exerts traction on the part 12 oriented to maintain the connector 10 coupled and the two frustoconical surfaces 20 and 24 are inside one another.

Figure 2B:
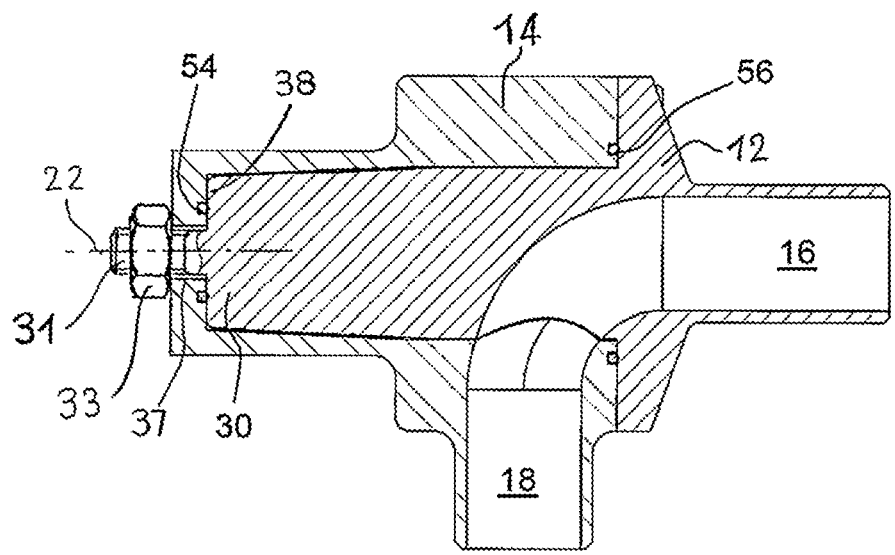
Figure 2C:
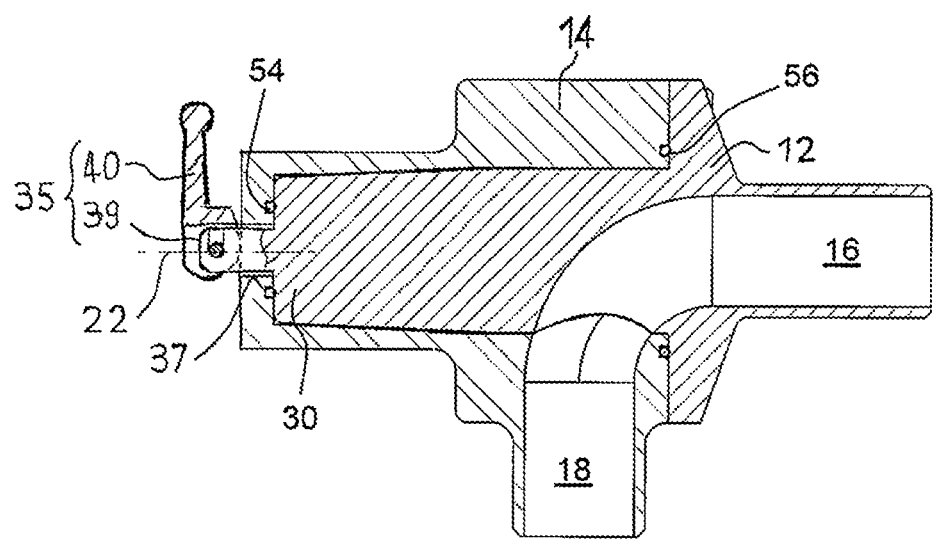

Traction mechanisms other than the screw-nut system shown in FIG. 2a may be envisaged. As shown in FIG. 2b for example, it is for example possible to extend the part 12 by a solid threaded rod 31 extending along the axis 22 from the axial end 38. The threaded rod 31 passes through the opening 37. A nut 33 separate from the two parts 12 and 14 bears on the part 14 and is able to cooperate with the threaded rod 31 to exert the required force. Another alternative, as shown for example in FIG. 2c, is a toggle system 35 bearing on the part 14 also able to exert traction on the part 12. The toggle system 35 comprises a rod 39 extending along the axis 22 from the axial end 38. The rod 39 passes through the opening 37. A handle 40 is pivotably connected to the rod 39. The handle 40 has an eccentric shape with respect to the axis of the pivot connection configured to bear against the part 14 and to pull on the rod 39 when the handle 40 is rotated.

Figure 2D:
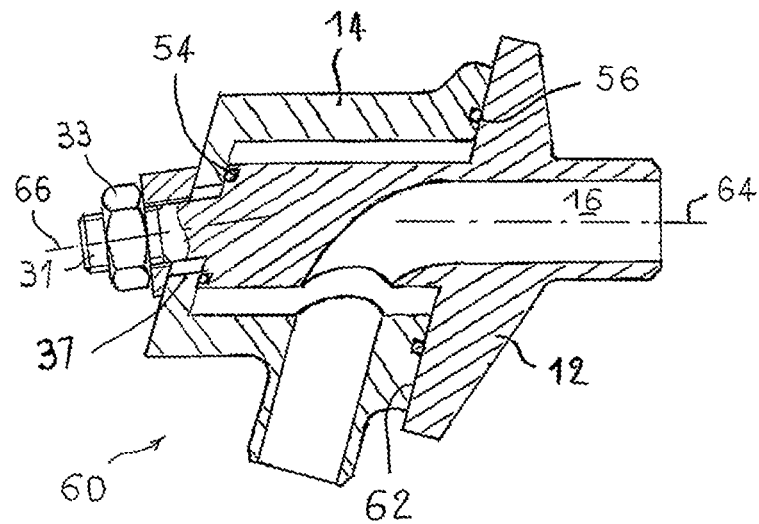

FIG. 2d shows a fluidic connector 60 comprising two parts 12 and 14. In FIG. 2d the two parts 12 and 14 are coupled. Unlike in the connector 10, the two parts 12 and 14 of the connector 60 are not positioned by means of a conical interference fit. The connector 60 is positioned by means of plane bearing surface 62 between the two parts 12 and 14. The plane bearing surface 62 enables fixing of the three degrees of freedom of the part 14 relative to the part 12. As in the variant from FIG. 2b, a threaded rod 31 extending part 12 and cooperating with the nut 33 holds them in position. In the connector 60 it is equally possible to employ any other means for holding the two parts 12 and 14 in position, in particular the screw 30 cooperating with a screwthread 36 produced in the part 12 or the toggle system 35. The plane bearing surface 62 enables adjustment of the relative position of the two parts 12 and 14 in the plane of the plane bearing surface 62 before locking the two parts 12 and 14 in position by tightening the nut 33. The channel 16 extends along an axis 64. The plane bearing surface 62 may be perpendicular to the axis 62 or inclined as shown in FIG. 2d. Moreover, the threaded rod 31 extends along an axis 66 that may coincide with the axis 64 or be offset as shown in FIG. 2d. A coincident arrangement of the axes 64 and 66 allows greater latitude in positioning the two parts 12 and 14 around the coincident axes 64-66. The relative orientation of the plane bearing surface 62 and the axes 64 and 66 is chosen in particular as a function of the volume available for placing the connector 60.

More generally, positioning by means of a conical interference fit enables elimination of five degrees of freedom per obstacle. The sixth degree of freedom, enabling immobilization of the two parts 12 and 14 with respect to one another, is eliminated by adhesion on tightening the locking mechanism. Moreover, in the variant from FIG. 2d, the plane bearing surface 62 enables elimination of three degrees of freedom per obstacle. The other three degrees of freedom are eliminated by adhesion on tightening the locking mechanism. Any other combination for suppressing degrees of freedom either by obstacle or by adhesion is equally possible in the context of the invention.

In the various variants described above, the locking mechanisms include an element passing through the orifice 37. The orifice 37 is not used for the circulation of the fluid circulating in the connector. In other words, the fluid does not pass through any section of the orifice 37. The position and the shape of the orifice 37 are therefore free of all constraints linked to the passage of the fluid, in particular in terms of flow section. The orifice 37 is provided only for a tie-rod to pass through, in this instance: the rod 39, the threaded rod 31 or the screw 30. The tie-rod advantageously occupies the opening 37 apart from a functional clearance. In the variants with frustoconical surfaces, the functional clearance enables the tie-rod to pass through the opening 37 taking account of the tolerances of the frustoconical surfaces. In the variant from FIG. 2d the functional clearance may be larger to enable adjustment of the position of the two parts 12 and 14 by allowing relative movement of the two parts on the plane bearing surface 62.

In the variants with frustoconical surfaces the locking mechanism advantageously exerts its force at the centre of the axial end 38. This centring of the force enables better distribution of the force over all of the frustoconical surfaces. In the part 12 the channel 16 extends along the axis 22. In the part 14 the channel 18 extends along an axis offset from the axis 26. In other words, the channel 18 does not pass through the plane face 52, which frees up space to enable the locking mechanism to exert its force at the centre of the face 52. The force exerted by the locking mechanism is centred relative to the frustoconical surfaces 20 and 24. Moreover, this force may be exerted by a rod or a screw not taking up any room at the radial periphery of the fluidic connector 10.

The locking mechanism may alternatively comprise a plurality of tie-rods for pulling on the part 12.

Figure 2E:
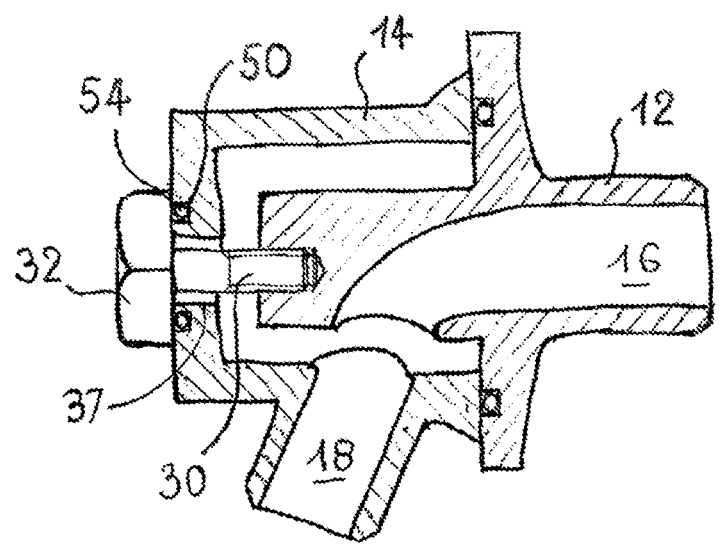

In the variants shown in FIGS. 2a, 2b, 2c and 2d, the seal 54 isolates the channels 16 and 18 from the orifice 37. Alternatively, the orifice 37 may be immersed in the fluid circulating in the channels 16 and 18 as shown in FIG. 2e. This variant may be of benefit, for example if the fluid has lubricating properties used for mounting the screw 30. In this variant the screw 30 is shown in a simplified form and it is of course possible to replace it with the screw shown in FIGS. 1a and 2a. Here the seal 54 is pressed against the part 14 and the head 32 of the screw 30. The groove 50 may be produced in the part 14 as shown in FIG. 2e or in the head 32 of the screw 30. This position of the seal 54 may also be employed in the variants with a toggle system or a threaded rod from FIGS. 2b, 2c and 2d.

Figure 2F:
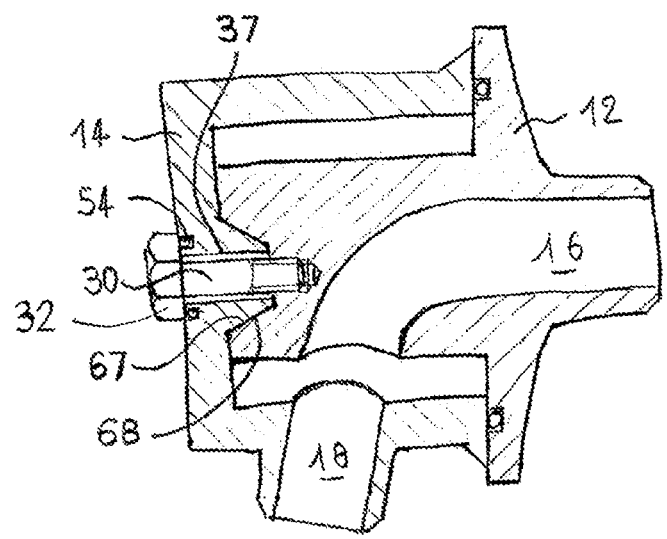

In the variant represented in FIGS. 1a, 1b and 2a the conical interference fit is made by means of a male frustoconical surface in the part 12 and a female frustoconical surface in the part 14. Alternatively, as shown in FIG. 2f, the opposite arrangement is equally possible. There are a male frustoconical surface 67 in the part 14 and a female frustoconical surface 68 complementary to the male frustoconical surface 67 in the part 12. The orifice 37 may extend inside the male frustoconical surface 67 along the axis of the male frustoconical surface 67 coinciding with the axis of the frustoconical surface 68 in order for the force exerted by the screw 30 to be centred relative to the conical interference fit. The force may equally be exerted by the toggle system 35 or by the nut 33 screwed onto the threaded rod 31. In FIG. 2f the seal 54 is disposed under the head 32 of the screw 30. The seal 54 may be disposed elsewhere and in particular between the two frustoconical surfaces 67 and 68.

Figure 3:
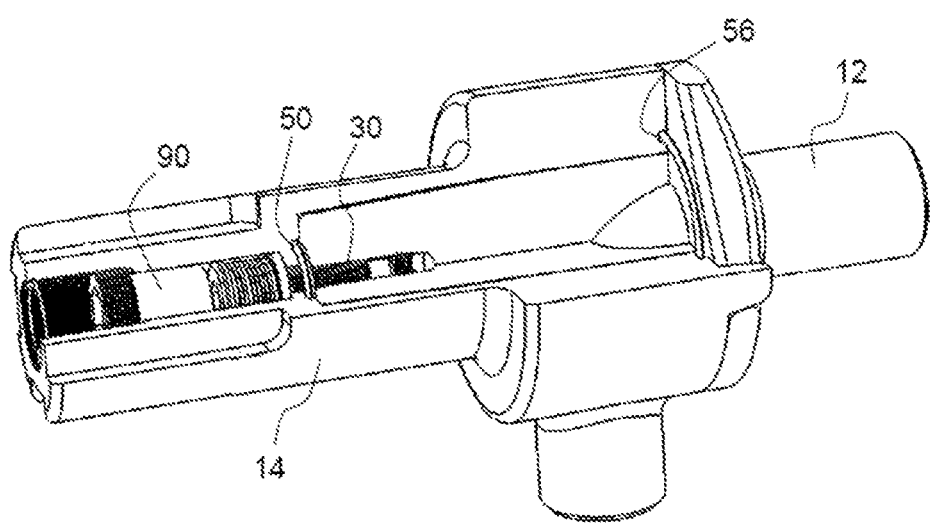
FIG. 3 is a partly cutaway perspective view of the fluidic connector from FIG. 2a in the coupled position.
Figure 4:
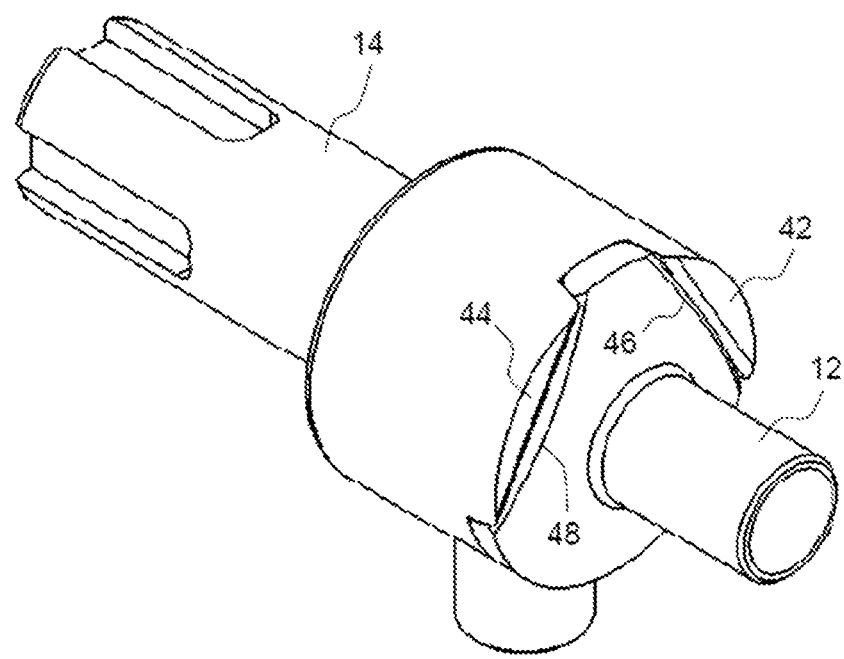
FIG. 4 is another perspective view of the fluidic connector from FIG. 2a in the coupled position.

FIG. 3 is a partly cutaway perspective view of the connector 10 from FIG. 2 in the coupled position and FIG. 4 is another perspective view of the fluidic connector from FIG. 2 again in the coupled position. In the embodiment shown each of the two frustoconical surfaces 20 and 24 is a surface of revolution about its respective axis 22 and 26. In order to control completely the relative orientation of the two parts 12 and 14 about the axes 22 and 26 when coincident, the connector 10 comprises a set of angular abutments. For example the part 14 comprises one or more protrusions 42 and 44 on which come to bear flats 46 and 48 on the part 12. Any other form of abutments is of course possible in the context of the invention.

It is possible to dispense with the set of abutments, for example by producing frustoconical surfaces that are not based on circles. For example a frustoconical surface comprising at least one plane surface inclined relative to the respective axis enables complete control of the relative orientation of the parts 12 and 14 about the axes 22 and 26 when coupling the connector 10. More generally, any frustoconical surface formed of a cone portion the generatrix of which bears on a non-circular curve enables complete control of the relative orientation of the parts 12 and 14.

Using frustoconical surfaces of revolution nevertheless has an advantage due to the symmetry of the interference fit around the axis 26. That symmetry enables perfect preservation of the force exerted by the locking mechanism along the axis 26, thereby preventing all risk of deformation when the force is exerted. Moreover, producing frustoconical surfaces of revolution is much easier, in particular by machining, than producing frustoconical surfaces that are not surfaces of revolution.

Amongst frustoconical surfaces of revolution it is possible to employ surfaces termed "Morse cones" the conicity of which is approximately 5%, depending on its dimensions. Remember that the conicity is the tangent of the half-angle at the apex of the cone. Morse cones are primarily used in machine tools for producing an interference fit between tools and the spindle of the machine tool. Morse cones provide very good centring and high adhesion. To be more precise, even if the force exerted by the screw 30 is released, the interference fit maintains the two coupled parts 12 and 14 in position.

It is of course possible to employ other types of cones. There may be cited by way of example the so-called "metric" cone which for its part is defined by a conicity equal to 5%. Its adhesion is also very high. The American standard cone has a conicity of 1/24, i.e. 29.16%. Centring is less precise and adhesion very weak compared to Morse and metric cones. Using the American standard cone, it is necessary to maintain the force exerted by the part 14 on the part 12 for as long as the connector 10 is coupled. With a conicity of the order of 5%, the force is useful for producing the coupling. The force may thereafter be released.

To seal the connector 10 and to be more precise the junction between the two channels 16 and 18, the connector 10 advantageously comprises one or more seals disposed between the two parts 12 and 14. The seal is or the seals are advantageously compressed by the locking mechanism enabling the interference fit of the two frustoconical surfaces 20 and 24. The force generated by the locking mechanism being oriented along the axis 26, the seal is or the seals are then preferably O-rings disposed around the axis 26. The force exerted by the locking mechanism is therefore uniformly distributed over all of the length of the seal or seals.

In the first variant shown in FIGS. 1a, 1b and 2a a circular groove 50 centred on the axis 26 is produced in the part 14 and to be more precise in the plane face 52. An O-ring 54 is placed in the groove 50. A functional clearance is provided between the face 38 of the part 12 and the face 52 of the part 14 when producing the interference fit between the two frustoconical surfaces 20 and 24. The seal 54 is sized to be compressed between the face 38 and the bottom of the groove 50 when the interference fit is produced. It is equally possible to produce the groove 50 in the face 38 and to place therein the seal 54 which is then compressed by the plane face 52.

The seal 54 is found in the other variants described with reference to FIGS. 2b, 2c and 2d. Any other type of seal compressed axially along the axis 26 or even radially around that same axis may equally be employed in the context of the invention.

The seal 54 is place on one side of the channel 18. On the other side of the channel 18 a second seal 56 is disposed in a groove 58 in another plane face 60 of the part 14. Like the face 52, the face 60 is perpendicular to the axis 26. For its part the part 12 comprises a face 62 perpendicular to the axis 22 and intended to come to face the face 60. As before, a functional clearance is provided between the faces 60 and 62 when producing the interference fit in order to enable compression of the seal 56 when producing the interference fit. The seals 54 and 56 are for example elastomer seals or seals formed by a coil spring with contiguous turns enclosed in a deformable envelope. This type of spring seal is known in particular under the trade name "Helicoflex" and was developed by the company Technetics whose registered office is in Columbia, S.C. (United States of America).

Figure 5:
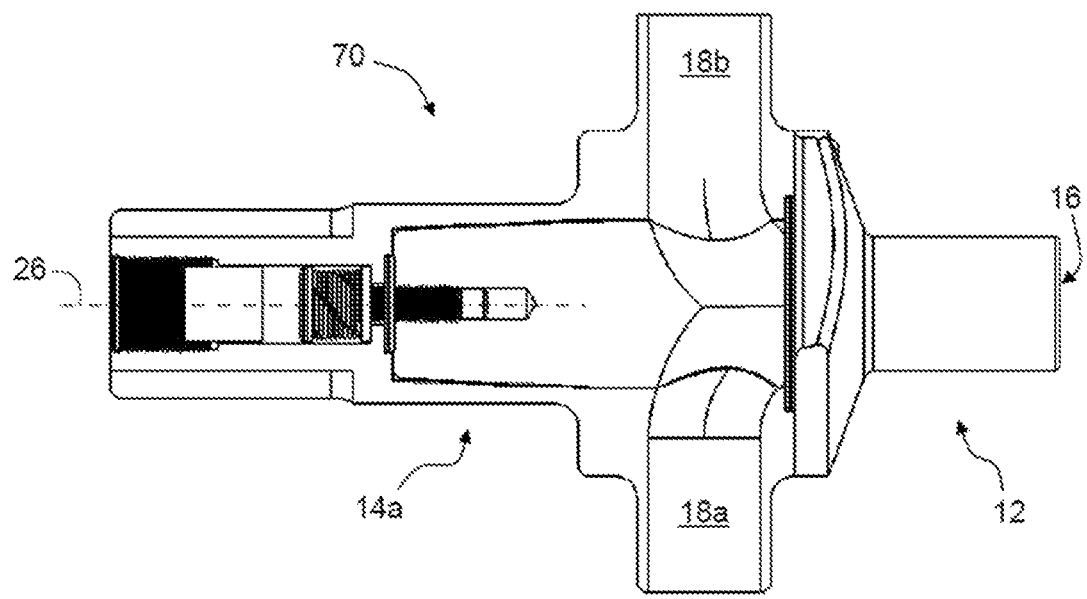
FIGS. 5 and 6 show two variants of a fluidic connector according to the invention.

FIG. 5 shows a variant of a fluidic connector 70 comprising two parts, as before. The fluidic connector 70 comprises the part 12 described above and a part 14a that is identical to the part 14 except for the presence of two channels 18a and 18b. When the fluidic connector 70 is coupled the two channels 18a and 18b of the part 14a communicate with the channel 16 of the part 12. It is of course possible to dispose as many channels as necessary in the part 14a.

Figure 6:
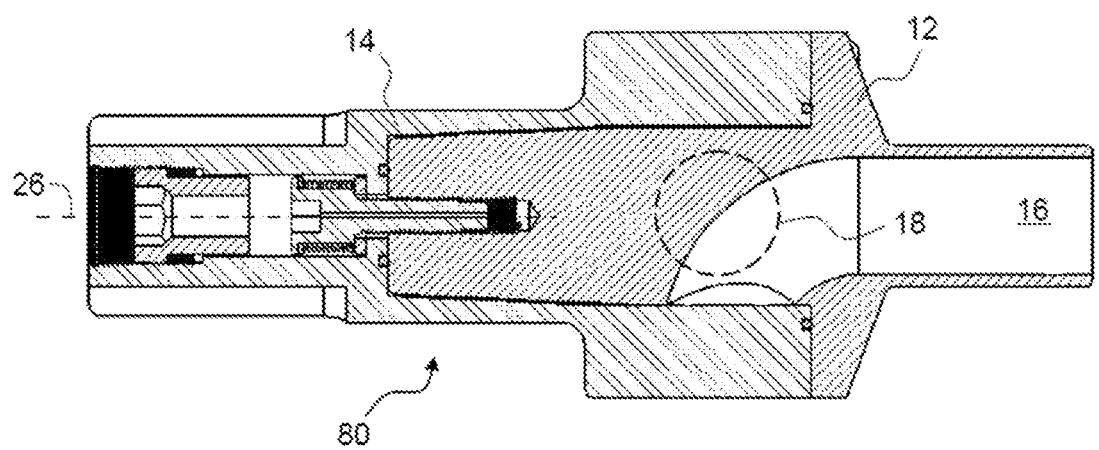

FIG. 6 shows another fluidic connector variant 80. The connector 80 is shown in section and in the section plane no channel can be seen in the part 14. In this variant the part 14 does comprise a channel 18 that extends radially in a plane other than the section plane, for example at 90° to the section plane. In this variant the set of abutments allows a plurality of angular positions of the part 12 relative to the part 14. A first angular position about the axis 26 with the part 12 an interference fit in the part 14 enables communication to be established between the channels 16 as shown in FIG. 2 and a second interference fit position enables interruption of the communication between the two channels 16 and 18 as shown in FIG. 6.

These so-called open and closed angular positions may equally be used in the variant from FIG. 5 in which the part 14a comprises a plurality of channels. It is equally possible to provide one or more intermediate angular positions in which partial communication between the channels 16 and 18 is established. The connector then functions as a constriction in the circulation of the fluid in the channels that communicate inside the connector.

If the two frustoconical surfaces are designed to adhere when they are fitted together, a particular operation is necessary to decouple the connector. To be more precise, it is necessary to exert on the part 12 a force opposite that produced by the screw 30 when tightening it. Merely loosening the screw 30 is not sufficient to enable decoupling of the connector because of the adhesion. This opposite force may be exerted by an external tool. However, the second part 14 advantageously comprises an extractor 90 able to exert the opposite force. In the various variants shown the extractor is formed of a threaded ring cooperating with a screwthread 92 in the spot facing 34 receiving the screw 30. To exert the opposite force on the part 12 the extractor 90 may be brought into contact with or into the vicinity of the head 32 of the screw 30. Then, through the bore of the extractor 90, the screw 30 is unscrewed and by bearing against the extractor 90 pushes back the part 12. This push enables separation of the interference fit between the two frustoconical surfaces 20 and 24. To prevent loosening of the screw 30 leading to loosening of the extractor 90, it is advantageous the screw 30 and the extractor 90 to be oppositely threaded, the screw 30 having a righthand thread and the extractor 90 a lefthand thread or vice versa. Alternatively, it is possible to loosen the screw 30 and then to tighten the extractor 90, which pushes on the head of the screw 30. In both cases, the screw 30 bears on the extractor 90 to separate the two parts 12 and 14 by exerting on the part 12 a force in the direction opposite the force for locking the connector.

The extractor 90 is advantageously configured to render the screw 30 captive. To be more precise, the section of the bore in the extractor 90 is smaller than the section of the head 32 of the screw 30. The sections are defined perpendicularly to the axis 26. The head 32 of the screw 30 therefore remains trapped in the spot facing 34 by the extractor 90 even in the absence of the part 12. The extractor 90 itself may also be captive. To this end, a circlip 91 may for example be placed at the end of the bore 92 to prevent the extractor 90 escaping from its screwthread 92.

To facilitate manoeuvring the screw, the ring forming the extractor 90 is pierced along the axis 26. It is possible to introduce through the bore a tool for manoeuvring the screw 30. To be more precise, the head of the screw 30 comprises a for example hexagonal imprint 93. A tool of complementary shape to the imprint 93 may then be passed through the extractor 90 to access the imprint 93. Manoeuvring the screw 30 enables both tightening it to immobilize the interference fit between the two frustoconical surfaces 20 and 24 and loosening it before manoeuvring the extractor 90.

It is possible to make the functioning of the screw 30 more secure. To this end, an elastic element may be placed between the head of the screw 30 and the bottom of the spot facing 34, such as a coil spring 94 for example. When loosening the screw 30 the head thereof therefore tends to move away from its bearing surface on the bottom of the spot facing 34. The spring 94 also has an advantage when tightening the screw 30. As soon as tightening begins, the spring 94 enables the screw 30 to exert a traction force on the part 12 tending to maintain the interference fit between the two frustoconical surfaces 20 and 24 and therefore to maintain the connector coupled.

The extractor 90 may comprise in its bore an imprint 96 for manoeuvring it. A tool matching this imprint will enable the extractor 90 to be turned in its screwthread and therefore to be advanced to bear on the screw 30 or to retract it along the axis 26. The imprint 96 has dimensions greater than those of the imprint 93 of the screw 30 in order to enable the tool for manoeuvring the screw 30 to turn freely in the bore of the extractor 90 without entraining it.

Figure 7:
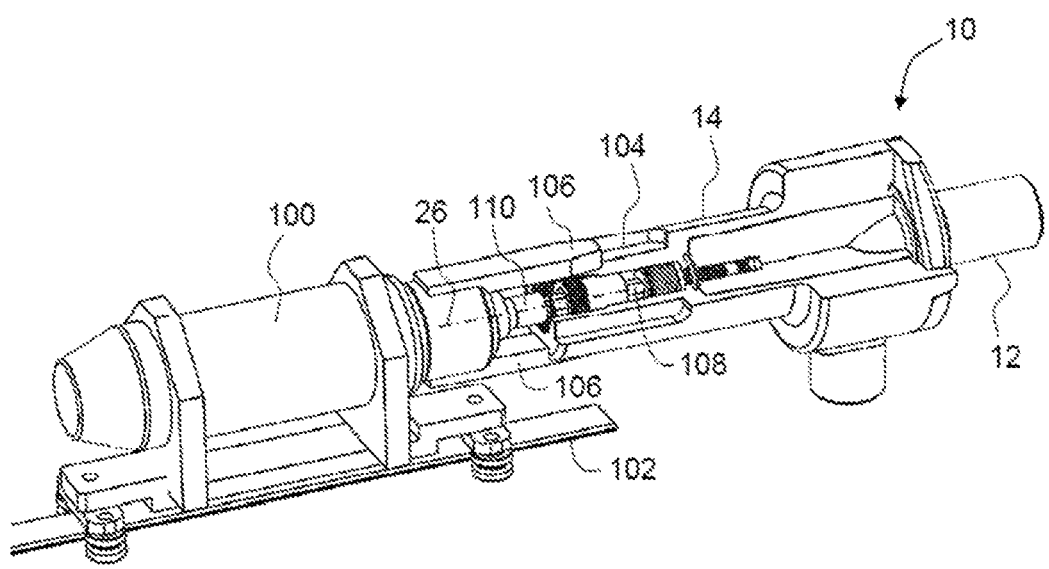
FIG. 7 shows a fluidic connector with a tool enabling remote coupling and decoupling of the connector.

FIG. 7 shows the fluidic connector 10 with a tool 100 for coupling and decoupling the connector 10. This tool is of benefit for remote operation. To be more precise, the tool 100 enables manoeuvring of the screw 30 and of the extractor 90. The tool 100 is mobile in translation along a rail 102 parallel to the axis 26. The tool 100 can therefore be moved away from the connector 10 or moved toward it to enable manoeuvring of the screw 30 and/or the extractor 90.

The tool 100 bears on the part 12, which may have a splined exterior surface 104 to enable fingers 106 to immobilize the tool 100 in rotation relative to the part 14 and to take up the tightening torque applied by the tool 100. Alternatively, any other means of preventing rotation between the tool 100 and the part 14 about the axis 26 may of course be used.

The tool has two imprints 108 and 110. The imprint 108 is complementary to the imprint 93 of the screw 30. The imprint 110 is complementary to the hexagonal imprint 94 of the extractor 90. The two imprints 108 and 110 are manoeuvred independently. The imprint 110 is hollow and the imprint 108 passes through it. The two imprints 108 and 110 are able to turn independently of one another. The imprint 108 is able to move in translation relative to the imprint 110 to reach the screw 30 regardless of the tightened or loosened position. Moreover, retraction of the imprint 108 enables the tool 100 to manoeuvre the extractor 90 without acting on the screw 30. The tool 100 enables the two imprints 108 and 110 to be driven in rotation separately. The tool 100 enables driving in translation along the axis 26 of at least the imprint 108. The movement in translation of the imprint 110 may be produced by a motor device inside the tool 100 or by the movement of the tool 100 along the rail 102.

The invention claimed is:

1. A fluidic connector configured to enable circulation of a fluid, the fluidic connector comprising:
   first and second parts configured to be coupled, each of the first and second parts comprising a channel in communication with each other when the first and second parts are in a coupled configuration, wherein the channels of the first and second parts are configured to convey the fluid;
   a locking mechanism configured to bear on the second part and to exert a force on the first part to hold the first and second parts in the coupled configuration, wherein the locking mechanism is configured to pass through an opening in the second part; and
   a seal fluidly separating the combined channels of the first and second parts from the opening,
   wherein the second part comprises a female frustoconical surface, the first part comprises a male frustoconical surface, the male and female frustoconical surfaces are complementary, an interference fit between the male and female frustoconical surfaces enables the relative position of the first and second parts to establish communication between the channels of the first and second parts, and the locking mechanism is configured to exert a force on the first part along an axis of the female frustoconical surface, and
   wherein the second part comprises an extractor in the form of a threaded ring configured to exert a force that enables decoupling of the first and second parts.

2. The fluidic connector of claim 1, wherein the locking mechanism comprises a screw having a head that bears on the second part, and the screw passes through the opening and cooperates with a screw thread on an axial end of the first part.

3. The fluidic connector of claim 2, wherein the screw extends along the axis of the female frustoconical surface, and the screw thread is on an axial end of the first part forming a reduced diameter section of the male frustoconical surface.

4. The fluidic connector of claim 3, wherein the locking mechanism exerts a force at the center of the axial end of the first part.

5. The fluidic connector of claim 1, wherein the male and female frustoconical surfaces have an angle that provides self-adhesion of the male and female frustoconical surfaces when fitted together.

6. The fluidic connector of claim 2, wherein the screw is configured to bear on the extractor to exert a force on the first part to decouple the male and female frustoconical surfaces.

7. The fluidic connector of claim 6, wherein the screw bears on the second part via an elastic element biased to move the screw away from a seat after unscrewing the screw from the screw thread of the first part.

8. The fluidic connector of claim 6, wherein the extractor is configured to render the screw captive.

9. The fluidic connector of claim 1, wherein each of the male and female frustoconical surfaces define a surface of revolution about an axis, and the axes of the male and female frustoconical surfaces coincide when the first and second parts are coupled, and the fluidic connector further comprises a set of angular abutments configured to define at least one orientation of the first and second parts about the coincident axes.

10. The fluidic connector of claim 9, wherein the set of angular abutments is configured to define first and second angular orientations of the first and second parts about the coincident axes, the first orientation enabling communication between the channels of the first and second parts, and the second orientation interrupting the communication between the channels of the first and second parts.

* * * * *